United States Patent Office 3,037,026
Patented May 29, 1962

3,037,026
ADDITION COMPOUNDS OF DIAZABICYCLO-OCTANE
William E. Erner, Wilmington, Del., and Adalbert Farkas, Media, and Harold Graboyes, Philadelphia, Pa., assignors to Air Products and Chemicals, Inc., a corporation of Delaware
No Drawing. Filed Feb. 11, 1959, Ser. No. 792,479
5 Claims. (Cl. 260—268)

The present invention relates to molecular addition compounds of diazabicyclo-octane and their use as catalysts and promoters in condensation reactions, particularly in the formation of plastics.

The synthesis of 1,4-diazabicyclo-(2,2,2)-octane in small amounts has been reported in prior literature. Thus, Ishiguro et al. [J. Pharm. Soc. Japan, pp. 1370-3 (1955)] report the synthesis of diazabicyclo-octane in small quantity by catalytic pyrolysis of N,N-bis(hydroxyethyl)-piperazine, and recovery of the bis-nitrophenolate from the steam distilled and ether extracted reaction product. Improved yields of this compound, also called triethylene diamine, are reported by Hromatka [Berichte 75B, 1302 (1942)], obtained by carefully controlled heating of N-beta bromoethyl-piperazine hydrobromide. Recently this compound has been made commercially available utilizing the process described in co-pending application Serial No. 628,723 filed December 17, 1956, now Patent No. 2,937,176, granted May 17, 1960. The method described in said pending application involves vapor phase reaction of an aliphatic amine, such as diethylene triamine, over solid acidic catalyst at a temperature in the range of 300° to 500° C. with concomitant formation of appreciable quantities of piperazine and some pyrazines as by-product. The desired diazabicyclo-octane is recovered by crystallization from a cut of the fractionated reaction product distilling in the approximate range of 165° to 175° C.

It has now been found that diazabicyclo-octane can be reacted quantitatively to form molecular addition compounds with hydroquinone, thus providing not only an improved procedure for quantitative determination of the diazabicyclo-octane in mixtures containing the same, but further affording a useful technique for recovery of this compound in high degree of purity. The hydroquinone addition compound of the diazabicyclo-octane as such, moreover, can be usefully employed as a catalyst or promoter wherein the available basicity or activity of the basic nitrogen is desirably blocked.

In the preferred embodiment of the invention, selective and quantitative precipitation of the diazabicyclo-octane with hydroquinone from a reaction mixture is obtained by first binding the primary and secondary amines in the mixture. Thus, in accordance with one such procedure the reaction mixture, diluted with acetone, is treated with an excess of organic isocyanate, thereby precipitating all of the primary and secondary amines as ureides. The filtrate separated from the precipitate consists essentially of diazabicyclo-octane and pyrazine in acetone, from which the former is quantitatively and selectively precipitated by addition of hydroquinone.

In a modified procedure the precipitation of the diazabicyclo-octane is accomplished without previous precipitation of the primary and secondary amines. Thus by adding acrylonitrile instead of isocyanate to the initial reaction mixture in acetone, the primary and secondary amines are converted to acetone-soluble propionitrile derivatives. By addition of hydroquinone to the obtained solution, the addition complex of diazabicyclo-octane is precipitated without interference by the primary and secondary amines. This procedure provides a reliable technique for ready quantitative determination of diazabicyclo-octane with high degree of accuracy.

In each of the above techniques the reaction of the diazabicyclo-octane with the hydroquinone is made selective by blocking the secondary amines (as well as the primary amines) through molecular addition reaction involving —CN— linkage. The several reactions can be represented thus:

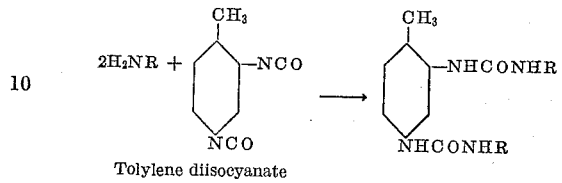
Tolylene diisocyanate

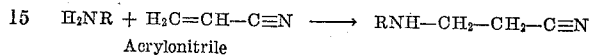
Acrylonitrile

If the hydroquinone solution is added directly to the original reaction product containing the diazabicyclo-octane and piperazine, without previous removal or blocking of the secondary amines, the hydroquinone will react with the piperazine and the diazabicyclo-octane precipitating both of these together. Separation of the two can then be effected by conversion to hydrochlorides releasing the hydroquinone. The hydrochlorides of piperazine and diazabicyclo-octane can be dissociated with caustic to release the free bases which are recovered by flash distillation and these bases separated by fractional distillation.

Instead of precipitating the hydroquinone complex from the total reaction effluent obtained by catalytic conversion of an alkylene polyamine, the hydroquinone may be reacted with a selected fractional distillate thereof concentrated in the diazabicyclo-octane, for instance the fraction distilling in the range of about 165–195° C. Or the crystalline diazabicyclo-octane separating out from the 165–195° C. distillate fraction may be directly reacted with hydroquinone in acetone or other solvent to form the desired addition complex.

The diazabicyclo-octane-hydroquinone addition complex corresponds to the probable formula:

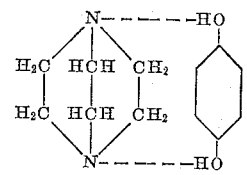

It is a white powdery material containing molar proportions of the two components. The complex melts at 250–260° C. and is soluble in the following solvents:

| Solvent | Temp., °F. | Solub., g./100 ml. |
|---|---|---|
| Acetone | 80 | 0.27 |
| Methylethyl ketone | 77 | 0.32 |
| Acetone n-heptane (1:1) | 77 | 0.094 |

The complex is split in aqueous acid, releasing the hydroquinone which can be removed by solvent extraction, steam distillation, or filtration. By addition of alkali to the aqueous acid solution, concentrating, and then fractionally distilling, the diazabicyclo-octane base is recovered in anhydrous form.

The diazabicyclo-octane-hydroquinone complex is useful in basic catalysts where the action of the base is desired to be delayed (blocked) such as in certain formulations for production of polyurethane foams and plastics and in curing of epoxy resins.

*Example 1*

(a) The reaction product containing diazabicyclo-octane was obtained by passing commercial diethylene triamine over silica-alumina catalyst (86% $SiO_2$) at 675° F. and atmospheric pressure and at a space rate of 1.2 volumes of charge (as liquid) per volume of catalyst. By condensation of the reaction effluent ammonia was separated from the liquid reaction products.

(b) A sample portion of the liquid condensate was dissolved in acetone in the proportions of about 20 to 23 grams per liter, and brought to a gentle boil. To the hot solution there was added dropwise 2,4-tolylene-diisocyanate until no additional reaction on further addition of reagent was discernible because of cloudiness. The solution, cloudy with precipitate, was slightly cooled and filtered. The boiling step promotes the reaction and facilitates filtration.

(c) The filtrate together with acetone washings of the precipitate was again brought to a gentle boil and the diisocyanate addition repeated dropwise for further precipitation of primary and secondary amines. This technique was repeated until the filtrate showed only slight turbidity on addition of the diisocyanate.

(d) A small amount of water was added to the final filtrate (about 0.1 to 0.2 ml. per liter), the solution boiled for five minutes, cooled and filtered. The cooled filtrate was concentrated to about ⅕ by volume of the original acetone solution and diluted with an equal volume of n-heptane. To this mixture there was added about ¼ volume of a saturated solution of hydroquinone in n-heptane and acetone (equal parts of each). The mixture was stirred and cooled by refrigeration for ten minutes to complete precipitation of the hydroquinone complex, which was separated by filtration and washed with acetone-heptane solution.

The recovered precipitate contained 50.5% by weight of diazabicyclo-octane, substantially the theoretical formula composition. Recovery of the diazabicyclo-octane was in the order of almost 95% of the content shown by mass spectrographic analysis.

*Example II*

Another sample of the liquid condensate prepared as described in Example Ia above, was mixed with an equal volume of acrylonitrile, the mixture placed in a closed container and held at 90° C. overnight. A weighed sample of the product was dissolved in a double volume of acetone and a saturated solution of hydroquinone in acetone added. The resulting precipitate of diazabicyclo-octane-hydroquinone complex was collected by filtration, washed in acetone solution, and dried. The weighed addition product showed a content of 23.4% diazabicyclo-octane by weight of the original sample of liquid condensate. Test of another sample of the same condensate by the procedure of Example I above, yielded 21.5% diazabicyclo-octane.

The diazabicyclo-octane-hydroquinone complex can be used as a curing agent for liquid epoxy resins. Thus a liquid epoxy resin which does not solidify by heating at 200° C. in the absence of catalyst, when admixed with about 1 to 10% by weight of the diazabicyclo-octane-hydroquinone complex and heated for one hour at 180 to 200° C., is transformed to a hard glassy resin of acceptable heat distortion characteristics. Using 10% of the diazabicyclo-octane as free base by weight of the same liquid resin, sticky to hard products were obtained in one hour at 100° C., while hard and glassy products were obtained by one hour heating at 135° C. The use of the complex is preferred in those instances in which the higher temperature cure is desired, particularly in premix formulations of the liquid resin and curing agent, which remains inactive on storage at room temperature but is readily cured at elevated temperature.

Instead of the hydroquinone complex of the diazabicyclo-octane as a curing agent for the epoxy resins, other acid addition complexes of the diazabicyclo-octane can be similarly employed. A known commercial liquid epoxy resin of the Novolac type (Epiphen) containing the polyfunctional grouping

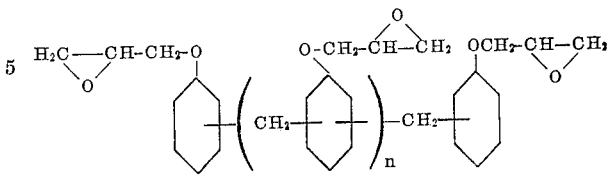

has an average molecular weight of 350–600, and is capable of cross-linking through the several epoxide rings. Such resin was mixed with 10% by weight of diazabicyclo-octane-$BF_3$ complex and cured for one hour at 200° C. A glassy resin of good hardness was obtained.

The $BF_3$ complex of diazabicyclo-octane is readily prepared by passing gaseous $BF_3$ into an ethanol solution of the diazabicyclo-octane to precipitate the complex. This addition compound is soluble in water but insoluble in organic solvents. It decomposes at 300° C. without melting.

In polyurethane formulations the hydroquinone complex or the $BF_3$ complex of the diazabicyclo-octane can be employed in quantities of about 0.1 to 1.0% by weight of the composition. Because of the blocked basicity of the tertiary N atoms delaying initiation of the full catalytic activity of the diazabicyclo-octane, considerable variation in desired properties of the polyurethane resin can be obtained by control of extent of cross-linking and the rate and timing of gas evolution to produce foamed or cellular products. A typical formulation for a rigid urethane foam is as follows:

| | Parts by weight |
|---|---|
| Polyhydroxy polyester compound (acid No. 15–20) | 100 |
| Water | 2 |
| Diazabicyclo-octane-hydroquinone | 0.5 |

The above components are thoroughly mixed and tolylene diisocyanate added in the amount of about 80 parts by weight in a suitable continuous mixer. The mixed composition is promptly poured into a mold. Curing of the obtained foam product can be accelerated, if desired, by moderate heating.

Obviously many modifications and variations of the invention hereinbefore set forth may be made without departing from the spirit and scope thereof and therefore only such limitations should be imposed as are indicated in the appended claims.

What is claimed is:

1. The hydroquinone molecular addition complex of diazabicyclo-octane corresponding to the formula:

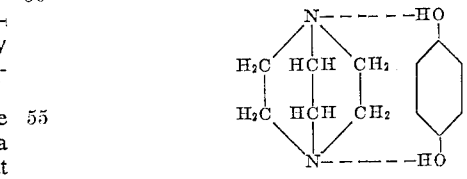

2. In the separation of diazabicyclo-octane from a reaction mixture obtained in the synthesis of such diazabicyclo-octane, which reaction mixture also contains, as accompanying reaction products of such synthesis, piperazine and other amines of the primary and secondary types; the method which comprises adding to said reaction mixture a reagent reacting selectively with only the primary and secondary amines by molecular addition through nitrogen to carbon bonding, and thereafter precipitating the diazabicyclo-octane from the obtained solution by addition thereto of hydroquinone, said reagent being selected from the group consisting of tolylene diisocyanate and acrylonitrile.

3. The method according to claim 2 wherein said reagent is tolylene diisocyanate.

4. The method according to claim 2 wherein said reagent is acrylonitrile.

5. In the separation of diazabicyclo-octane from a reaction mixture obtained in the synthesis of such diazabicyclo-octane, which reaction mixture also contains, as accompanying reaction products of such synthesis, primary and secondary amines; the method which comprises admixing with said reaction mixture at least sufficient acrylonitrile to react with the primary and secondary amines in said mixture, and adding to the obtained liquid mixture a solution of hydroquinone in an inert solvent to precipitate the diazabicyclo-octane selectively as an addition complex with said hydroquinone.

References Cited in the file of this patent

UNITED STATES PATENTS

| | | |
|---|---|---|
| 1,914,434 | Kropp et al. | June 20, 1933 |
| 2,755,279 | Baltzly et al. | July 17, 1956 |
| 2,853,467 | Bloom et al. | Sept. 23, 1958 |
| 2,891,927 | Philipson | June 23, 1959 |
| 2,949,431 | Britain | Aug. 16, 1960 |

OTHER REFERENCES

Beilstein's Handbuch der Organischen Chemie, vol. 6, page 842 (1923).

Hromatka et al.: Berichte, vol. 76, pages 712–717 (1943).

Whitmore: Organic Chemistry, pages 616–617 (2nd ed.), 1951.